United States Patent [19]

Grossinger et al.

[11] Patent Number: 5,227,915
[45] Date of Patent: Jul. 13, 1993

[54] DIFFRACTIVE OPTICAL ELEMENT

[75] Inventors: Israel Grossinger; Joseph Kedmi, both of Rehovot, Israel

[73] Assignee: Holo-or Ltd., Rehovot, Israel

[21] Appl. No.: 722,372

[22] Filed: Jun. 25, 1991

Related U.S. Application Data

[63] Continuation of Ser. No. 479,474, Feb. 13, 1990, abandoned.

[51] Int. Cl.$^5$ .................. G02B 5/18; G02B 27/44
[52] U.S. Cl. .................. 359/565; 359/569; 359/575
[58] Field of Search .............. 350/162.16, 162.22, 350/452, 162.2; 359/575, 573, 565, 566, 569

[56] References Cited

U.S. PATENT DOCUMENTS

| | | | |
|---|---|---|---|
| 4,246,338 | 1/1981 | Kaplan | 359/575 |
| 4,637,697 | 1/1987 | Freeman | 350/162.22 |
| 4,679,901 | 7/1987 | Dammann et al. | 350/162.22 |
| 4,708,436 | 11/1987 | Kleinknecht | 350/162.16 |
| 4,846,552 | 7/1989 | Veldkamp et al. | 350/162.2 |
| 4,895,790 | 1/1990 | Swanson et al. | 350/162.2 |
| 4,936,665 | 6/1990 | Whitney | 359/573 |

FOREIGN PATENT DOCUMENTS

| | | | |
|---|---|---|---|
| 59-97103 | 6/1984 | Japan | 350/162.2 |
| 1-142604 | 6/1989 | Japan | 350/162.16 |

OTHER PUBLICATIONS

Lessem et al. "The Kinoform: A New Wavefront Reconstruction Device," *IBM J. Res. Develop.*, 1969, pp. 150 to 155.

Wai-Hon Lee, "Computer-Generated Holograms, Techniques and Applications," *Progress in Optics XVI*, Wolf, Ed., North Holland, 1978, pp. 121-232.

Kirk et al, "Phase-Only Complex-Valued Spatial Filter", *Journal of the Optical Society of America*, vol. 61, No. 8, Aug. 1971, pp. 1023 to 1028.

D'Auria et al, "Photolithographic Fabrication of Thin Film Lenses," *Optics Communications*, Jul. 1972, vol. 5, No. 4, pp. 232-235.

Dammann, "Blazed Synthetic Phase-Only Holograms," *Optik 31*, 1970 pp. 95-104.

Nishihara et al, "Micro Fresnel Lenses," *Progress in Optics XXIV*, ed. E. Wolf, 1987, Elsevier Publishers B. V., pp. 3-37.

Swanson et al, "Diffractive Optical Elements For Use Infrared Systems," *Optical Engineering*, vol. 28, No. 6, Jun. 1989, pp. 605-608.

Swanson et al, "Infrared Applications of Diffractive Optical Elements," *SPIE vol. 883: Holographic Optics*, 1988, pp. 155-162.

Veldkamp et al, "Developments in Fabrication of Binary Optical Elements," *SPIE vol. 437: International Conference On Computer-Generated Holography*, 1983, pp. 54-59.

*Primary Examiner*—Martin Lerner
*Attorney, Agent, or Firm*—Limbach & Limbach

[57] ABSTRACT

A diffractive optical element and a method to produce same is disclosed. The optical element comprises a base and at least first and second phase zones wherein the first phase zone comprises a first multiplicity of steps and the second phase zone comprises a second multiplicity of steps and wherein the first multiplicity and the second multiplicity of steps are different. The method to produce the diffractive optical element of the present invention includes the step of defining a collection of masks for creating stepped phase zones wherein at least one of the collection of masks partially masks out at least one phase zone such that the at least one phase zone will be partially etched.

3 Claims, 4 Drawing Sheets

FIG. 3A
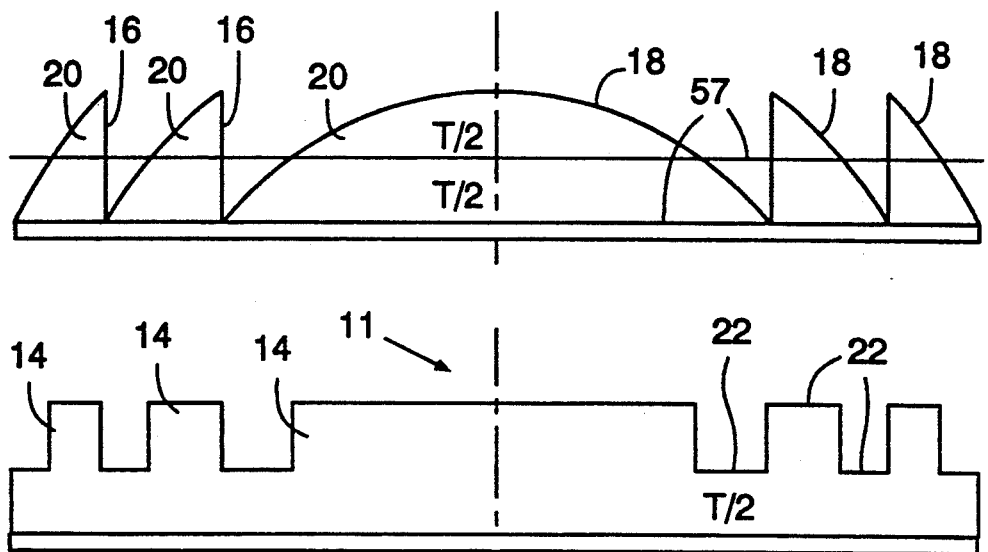
FIG. 3B
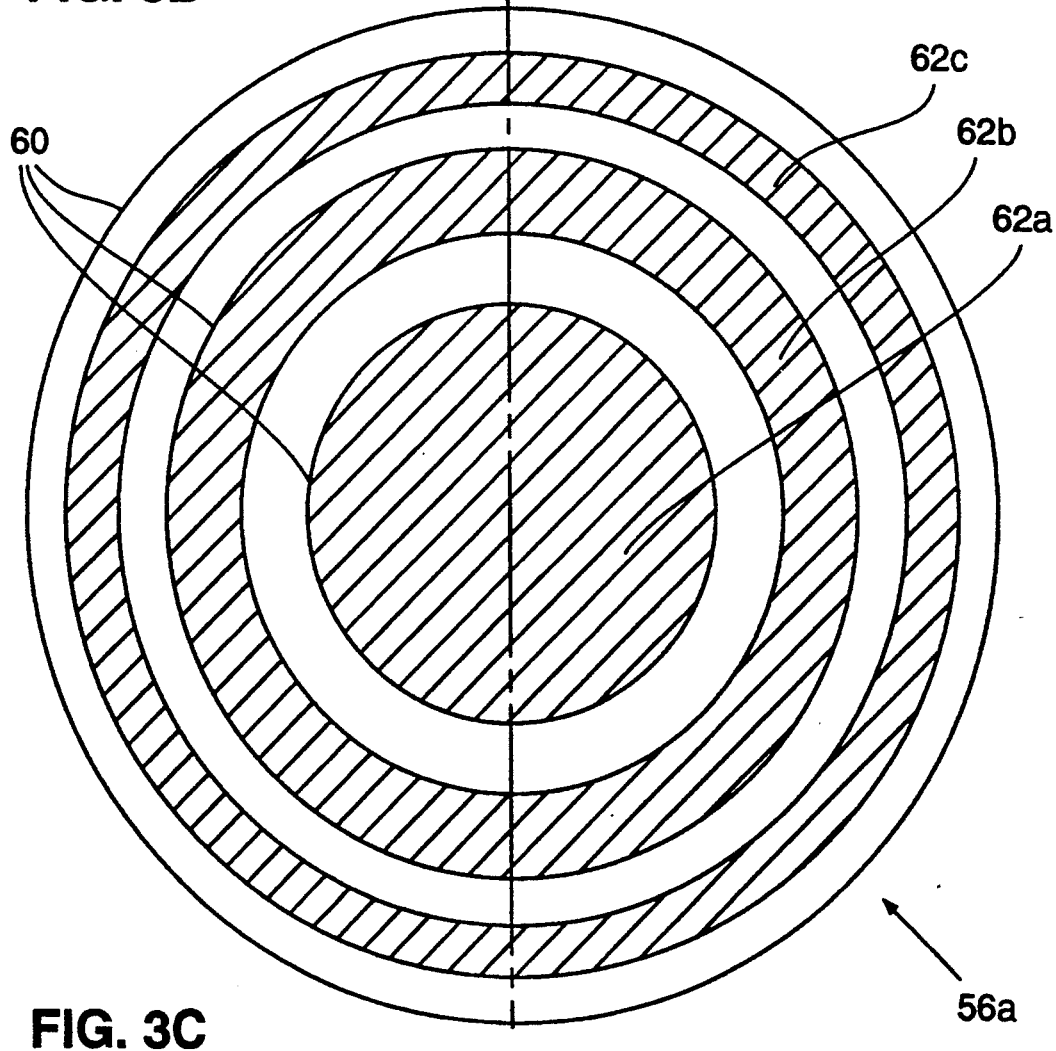
FIG. 3C

FIG. 4A
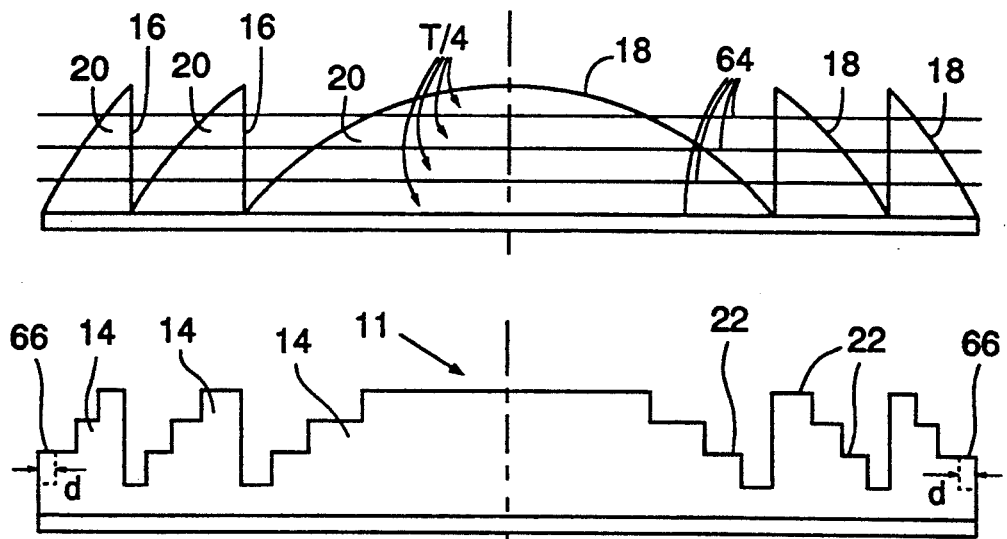
FIG. 4B
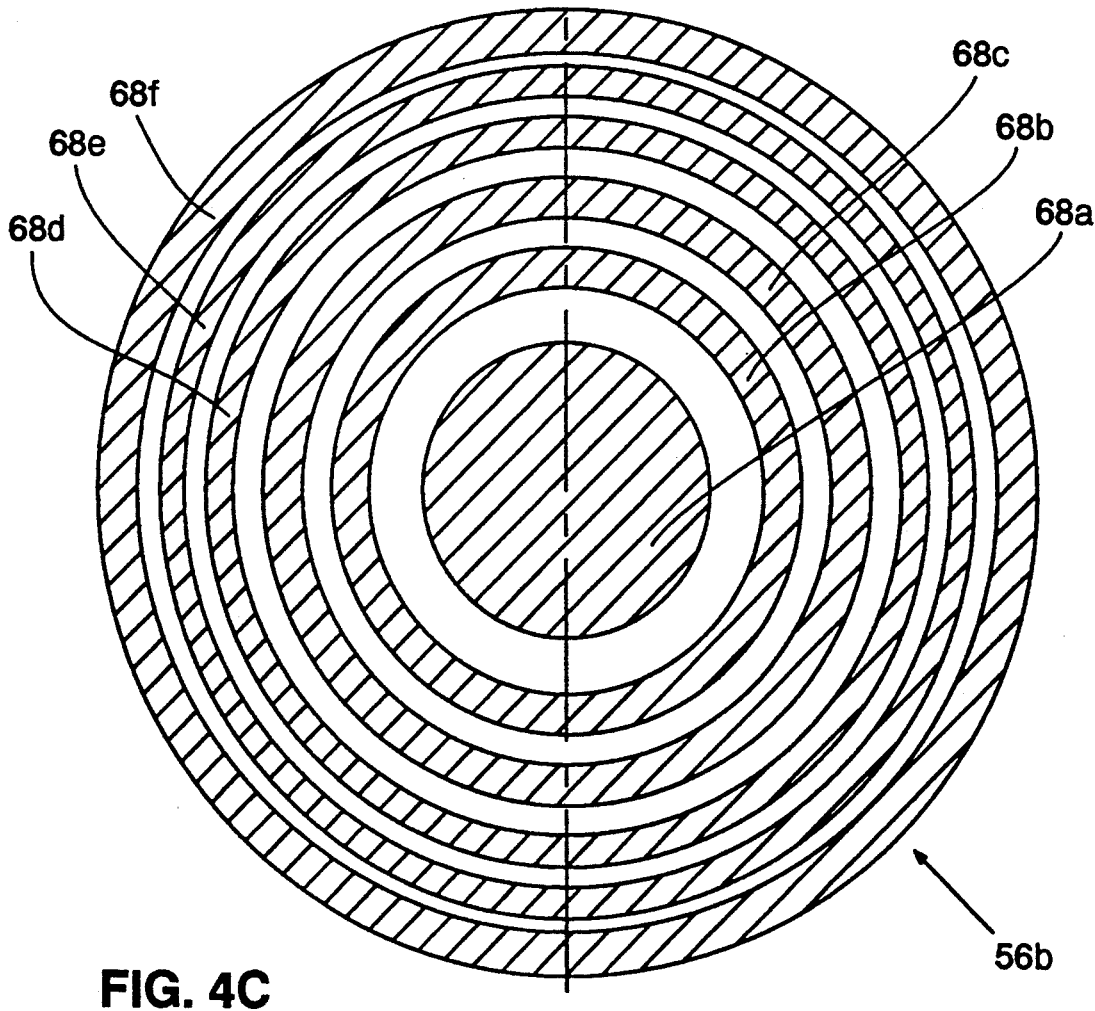
FIG. 4C

FIG. 5A
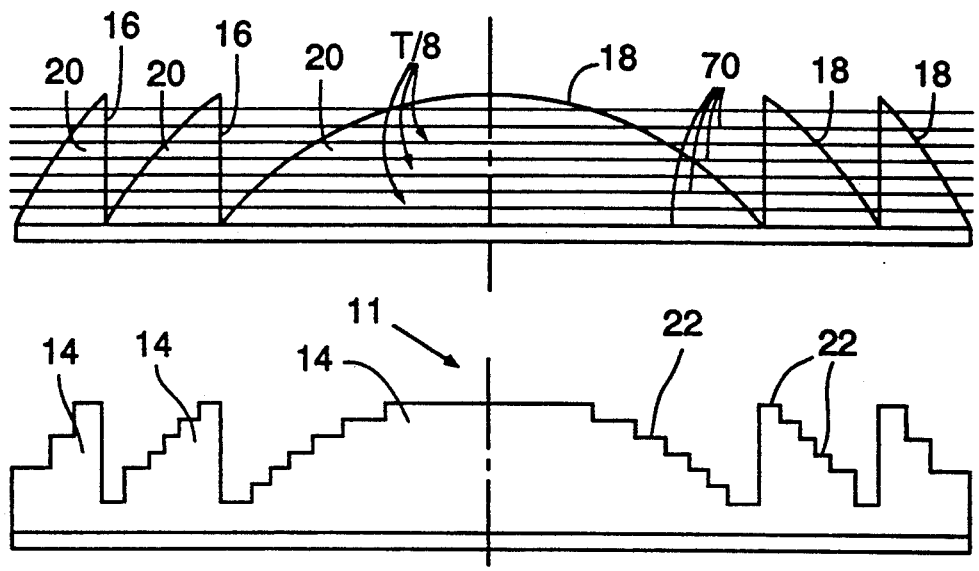
FIG. 5B
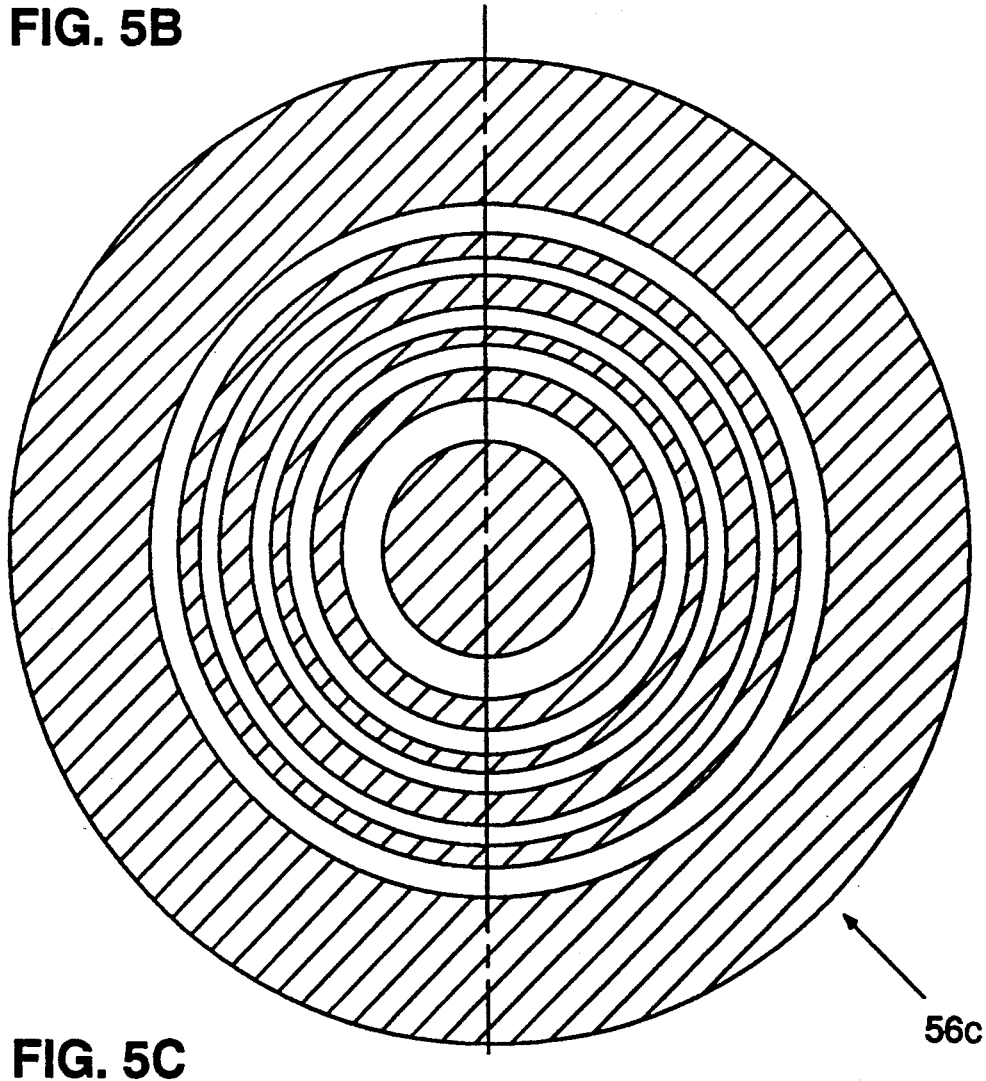
FIG. 5C

DIFFRACTIVE OPTICAL ELEMENT

This is a continuation of co-pending application Ser. No. 07/479,474 filed on Feb. 13, 1990 now abandoned.

FIELD OF THE INVENTION

The present invention relates to diffraction optical elements generally.

BACKGROUND OF THE INVENTION

It is known in the art to produce diffractive optical elements which manipulate light beams, an example light beam manipulation being the conversion of planar or spherical wavefronts to generalized wavefronts. The diffractive optical elements are generally thinner, lighter and more versatile than standard optical elements and are, therefore, desirable for use laser beam handling systems such as laser scanners, compact discs, laser computerized processing, laser radars and bar code scanners.

The article, "Micro Fresnel Lenses" by H. Nishihara and T. Suhara in *Progress in Optics XXIV*, edited by E. Wolf, presents background information on diffraction lenses of the Fresnel type.

The article, "Blazed Synthetic Phase-Only Holograms," by H. Dammann, published in *Optik* 31, 1970, pp. 95-104, discusses the efficiencies of diffractive lenses for use with holograms.

A method of manufacturing diffractive optical elements and its usefulness is discussed in the following articles by Gary J. Swanson and Wilfred B. Veldkamp:

"Diffractive Optical Elements for Use in Infrared Systems," *Optical Engineering*, June 1989, Vol. 28 No. 6, pp. 605-608;

"Infrared Applications of Diffractive Optical Elements,", *SPIE Vol. 883: Holographic Optics: Design and Applications* (1988), pp. 155-162;

"Developments in Fabrication of Binary Optical Elements," *SPIE Vol. 437: International Conference on Computer-generated Holography*, 1983, pp. 54-59.

The optical elements produced by the method of Swanson and Veldkamp have a multiplicity of phase zones whose shape is defined by the optical element phase profile and is approximated by a series of steps. Each zone has the same number of steps and the width of each step of a zone varies according to the phase profile of the zone. The number of steps per phase zone defines the efficiency of the optical element, where, for example, eight steps produce a optical element with roughly 95% efficiency and sixteen steps produce one with 99% efficiency. Unfortunately, the smallest zone dictates the number of steps which limits the efficiency of the optical element.

The method includes the step of generating N masks which, when used to etch the material of an optical element, produce $2^N$ steps in each phase zone. Every step has the same height but the width varies according to the zone shape.

The efficiency of the optical elements produced increases discretely with the number of masks used since each mask doubles the number of steps. The method does not provide a way to produce an optical element with an efficiency between that of the discrete levels.

The abovementioned efficiency measurements are for a wide beam which impinges upon the optical element. For a narrow beam scanning along the optical element, as is common in laser scanners, the efficiency of the optical element produced via the abovementioned method will vary across the optical element. This is due to the fact that the width of the steps vary. If a step is as wide or wider than the beam width, the narrow beam will effectively impinge on a flat surface.

U.S. Pat. No. 4,846,552 describes a method to produce a binary planar optical element utilizing holographic and very large scale integration (VLSI) techniques.

SUMMARY OF THE INVENTION

It is an object of the present invention to manufacture a diffractive optical element whose number of steps per zone varies across the optical element.

There is therefore provided, a diffractive optical element comprising a base and at least first and second phase zones wherein the first phase zone comprises a first multiplicity of steps and the second phase zone comprises a second multiplicity of steps and wherein the first multiplicity and the second multiplicity of steps are different.

Additionally, in accordance with a preferred embodiment of the present invention, the heights of the first and the second multiplicities of steps are not constant.

Furthermore, in accordance with a preferred embodiment of the present invention, the number of steps per a predetermined size area of the optical element is generally equivalent across the optical element.

There is also provided, in accordance with a preferred embodiment of the present invention, in a method of fabricating a diffractive optical element the step of defining a collection of masks for creating stepped phase zones wherein at least one of the collection of masks partially masks out at least one phase zone such that the at least one phase zone will be partially etched.

Finally, there is provided, in accordance with a preferred embodiment of the present invention, a method of fabricating a diffractive optical element including the steps of defining a collection of masks for creating stepped phase zones wherein at least one of the collection of masks partially masks out at least one phase zone such that the at least one phase zone will be partially etched, generating the collection of masks, coating the diffractive optical element with a layer of photoresist, placing one mask of the series of masks on the layer of photoresist, exposing the photoresist through the one mask thereby producing the mask pattern on the photoresist, etching the optical element, coating the diffractive optical element with a layer of photoresist, aligning another mask of the collection of masks on the layer of photoresist and repeating the steps of exposing, etching, aligning and coating until the entirety of the collection of masks have been utilized.

BRIEF DESCRIPTION OF THE DRAWINGS

The present invention will be understood and appreciated more fully from the following detailed description taken in conjunction with the drawings in which:

FIG. 3A is a cross-sectional illustration of an ideal diffractive element marked to show the generation of a first mask;

FIG. 3B is a cross-sectional illustration of an optical element after being etched with a first mask;

FIG. 3C is a schematic illustration of a first mask placed on a optical element to be etched;

FIG. 4A is a cross-sectional illustration of an ideal diffractive element marked to show the generation of a second mask;

FIG. 4B is a cross-sectional illustration of a optical element after being etched with a first and a second mask;

FIG. 4C is a schematic illustration of a second mask placed on a optical element to be etched;

FIG. 5A is a cross-sectional illustration of an ideal diffractive element marked to show the generation of a third mask;

FIG. 5B is a cross-sectional illustration of a optical element after being etched with first, second and third masks; and FIG. 5C is a schematic illustration of a third mask placed on a optical element to be etched.

DETAILED DESCRIPTION OF PRESENT INVENTION

Figure 1A:
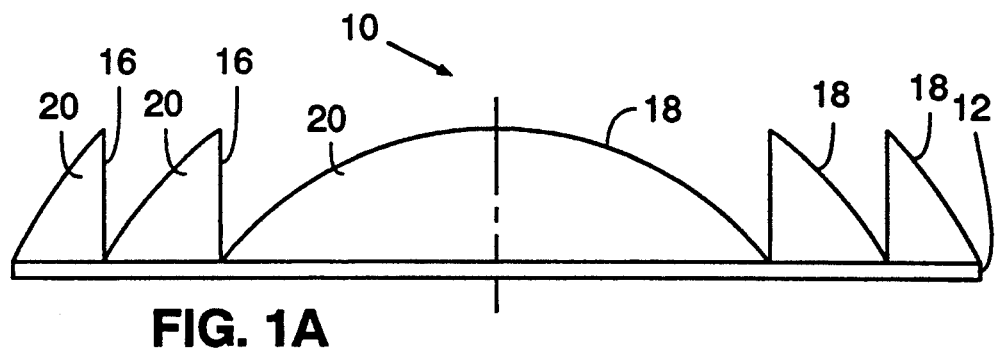
FIG. 1A is a cross-sectional illustration of an ideal diffractive optical element.
Figure 1B:
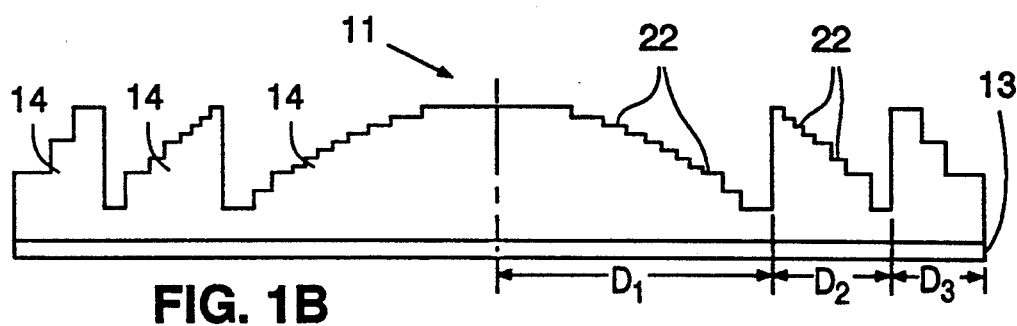
FIG. 1B is a cross-sectional illustration of a diffractive optical element with locally controlled efficiency constructed and operative in accordance with a preferred embodiment of the present invention.
Figure 2:
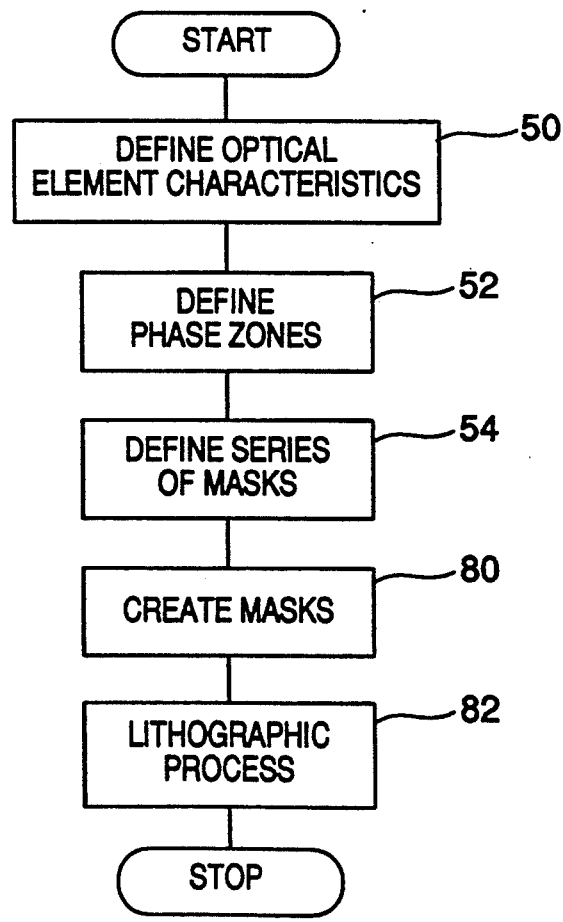
FIG. 2 is a flow chart illustration outlining a method of fabricating the diffractive optical element of FIG. 1B.

Reference is now made to FIGS. 1A and 1B which respectively illustrate an ideal diffractive optical element 10 and an optical element with locally controlled efficiency 11 constructed and operative in accordance with a preferred embodiment of the present invention.

Ideal diffractive optical element 10 comprises a base 12 integrally formed with a multiplicity of phase zones 20 forming the continuous phase profile of the phase retardation distribution function of a given wavefront of an incoming beam of light. As is known in the art, the shape of the phase zones 20 is a straight edge 16 on one side and a smooth curve 18 on the other.

In accordance with a preferred embodiment of the present invention, optical element 11 comprises a multiplicity of phase zones 14 integrally formed on base 13 wherein the ideal shape of curve 18 is approximated by a series of steps 22 whose height and width vary. The width of the steps is generally dictated by the minimum resolution of a fabrication process, described in more detail hereinbelow, by which the steps are produced.

The number of steps per zone 14, varies across the optical element 11 so as to produce a generally close approximation of the shape of each curve 18. A phase zone 14 can have a large number of closely spaced small steps 22 in one area of the phase zone 14 while other areas may have deeper steps spread further apart. Alternatively, the entirety of the steps of a phase zone 14 can be of equal height throughout. The arrangement of the steps 22 is defined by the required local and global efficiency.

It will be appreciated by those skilled in the art that, due to the generally small width of the steps 22, the optical element 11 of the present invention better approximates the wavefront of an incoming light beam than prior art optical elements and is therefore highly efficient. In addition, the efficiency of the optical elements 11 is not limited to the discrete levels of U.S. Pat. No. 4,895,790 since the number of steps of phase zones 14 is not constant.

Furthermore, the optical element 11 of the present invention can control the local efficiency. For such an element 11, the width of the steps 22 is generally identical, subject to manufacturing resolution constraints. A narrow beam scanning across such an optical element will typically impinge upon a generally equal number of steps as it scans across the optical element and therefore, the beam will be diffracted generally equally as well throughout the scan. In prior art optical elements with an identical number of steps per phase zone regardless of width, a narrow scanning beam will be diffracted poorly by wide phase zones and more efficiently by thin phase zones.

Reference is now made to FIGS. 2, 3A-3C, 4A-4C and 5A-5C which respectively illustrate a method for fabricating optical elements 11 and the generation of three masks. In step 50 the optical element is defined by defining the characteristics of both the incoming light beam and the desired outgoing light beam. This defines the optical properties of the optical element to be manufactured.

For example, a spherical phase profile for a collimating lens is:

$$\text{phi}(x,y) = (2\text{pi}/\text{lambda}) * sqrt(x^2 + y^2 + F^2) \quad (1)$$

where lambda is the wavelength of the incoming light beam.

A second example is that of a quadratic phase profile:

$$\text{phi}(x,y) = 2\text{pi}/\text{lambda}((x^2 + y^2)/2F) \quad (2)$$

A third example is a more general aspheric phase profile:

$$\text{phi}(r) = 2\text{pi}/\text{lambda}(\text{sum}(a_i r^i)) \quad (3)$$

where r is the radius from the center of the optical element and is equivalent to $sqrt(x^2+y^2)$, the $a_i$ are coefficients which are defined by the designed use of the optical element and i varies between 1 and the required number of coefficients $a_i$.

In step 52 the phase zones are defined by evaluating the phase profile phi(x,y) modulo 2 pi. This produces the locations on the optical element of the straight edges 16 thereby producing varying widths $D_i$ (FIG. 1B) of the phase zones 14. M is the number of phase zones 14 on the optical element and i varies between 1 and M. In addition, a height T of the phase zones 14 is defined as follows:

$$T = \text{lambda}/\text{delta\_n} \quad (4)$$

where delta_n is the difference between the indices of refraction of the medium in which the elements are embedded and the material of the optical element, such as glass, gallium arsenide, zinc selenide, germanium or quartz, out of which the optical element 11 will be made.

The phase zones are produced via VLSI etching techniques, as described hereinbelow. The essential equipment necessary for producing the phase zones include, for example, an electron or laser beam pattern generator for generating a series of masks to be placed successively on the optical element 11, a spin coater to spread photoresist on the optical element 11 to protect the not-to-be-etched portions, a mask aligner and U.V. exposure system for aligning successive masks with high accuracy and for exposing the photoresist, and a reactive ion etcher to etch the optical element 11 to a predefined depth wherever a given mask does not cover the optical element 11.

In step 54 a series of binary masks 56 are defined. As will be shown hereinbelow, the masks 56 can be defined so as to etch the entirety of each phase zone 14, to partially etch at least one section of at least one phase zone 14, or to etch the entirety of only some of the phase zones 14.

FIGS. 3A–3C, 4A–4C and 5A–5C illustrate how the binary masks 56 are defined for an example circular optical element 11 of three phase zones 14 to be etched with three masks 56a, 56b and 56c. FIGS. 3A, 4A and 5A illustrate a side view of the ideal phase zones 20. FIGS. 3C, 4C and 5C illustrate, in a top view, the masks 56a, 56b and 56c which produce the etched optical element 11 shown in side view in FIGS. 3B, 4B and 5B, respectively.

A first example mask 56a of FIG. 3C is one which will etch the entirety of each phase zone 14. The mask 56a is defined by evaluating equation 1 modulo pi over the entirety of circular optical element 11 to create a multiplicity of equiphase boundaries, shown as circular rings 60 on FIG. 3C, where the first equiphase boundary is at the origin of the mask 56a. The first masked out portion 62a of mask 56a is that which extends between the first and second equiphase boundaries. The areas between subsequent sequential equiphase boundaries alternate from being exposed to not being exposed where the masked out portions are marked as 62b and 62c.

This operation can be envisioned by drawing two lines 57, one at a height of T/2 and one at the base 13, where T is defined in equation 2 and shown in FIG. 3A. The points of intersection between the curves 18 and the upper line 57 mark the end of one of a multiplicity of masked out portions 62a–62c of mask 56a. The beginning of each masked out portion 62a–62c is defined by a point 59 where the lower line 57 intersects the curves 18.

A second mask, marked 56b in FIG. 4C, is one which fully etches two of the phase zones 14 of the example optical element 11 and partially etches the third phase zone 14. Mask 56b is defined in a manner similar to that described hereinabove with the following two exceptions; a) equation 1 is evaluated modulo pi/2, equivalent to drawing four lines 64 spaced apart by a distance of T/4 and b) for every ith phase zone 14, a check is made that the width of each possible step 22 to be produced will be larger than a predetermined minimum width which is larger or equal to the manufacturing resolution. If the width of the possible step 22 is larger than the resolution, then the step 22 will be etched. Otherwise, the area will be masked out so as not to produce the possible step 22. For example, in FIG. 4B, an outermost step 66 has a width d which is less than the resolution of the manufacturing process. Thus, step 66 is masked out. The resultant mask has masked out portions 68a–68f where portion 68f additionally masks out step 66.

A third example mask 56c is defined wherein equation 1 is evaluated modulo pi/4, equivalent to drawing eight lines 70 spaced apart by a distance of T/8. Once again, the width of each possible step 22 is checked against the minimum width and masked out if the width is too small. In FIG. 5B, the widths of the possible steps 22 in the outermost phase zone 14 would all be smaller than the manufacturing resolution and thus, the entirety of the outermost phase zone 14 is masked out. In addition, portions of the innermost phase zone 14 and the middle phase zone 14 are masked out. Thus, in FIG. 5B, only seven of the possible eight steps 22 in the innermost phase zone 14 and only six of the possible eight steps of the middle zone 14 are produced. In this manner, some of phase zones 14 are partially etched and others are not etched at all.

It will be appreciated that, for optical elements 11 across which a narrow light beam will be scanned, the number of steps 22 of each phase zone 14 is such that the narrow beam generally encounters a constant number of steps. In this manner, the diffraction of the narrow beam is generally constant as it scans across the optical element 11. This effect is achieved by ensuring that enough steps 22 are etched per phase zone 14 such that the variance in their widths is small.

It will be appreciated that utilization of a large number of masks 56 for etching the optical element 11 will produce a large number of steps per zone and therefore, the efficiency of the optical element 11 will be high. The lower limit to the number of steps is the required efficiency. The upper limit to the number of steps is defined by the resolution of the manufacturing process and by economic considerations. Each additional mask adds to the production costs of the optical element 11.

The number of masks 56 to be produced depends on the number of steps desired and the desired height of each step 22. For each mask 56, equation 1 is evaluated modulo $pi/2^{(l-1)}$, where l is the mask number. The etch depth, or step height, is $T/2^l$ for the lth mask.

In step 80, the masks 56 are created via printing a photoplot of them and then photoreducing them to the desired size of the optical element 11. Alternatively, the masks 56 can be directly generated with an electron beam generator.

In step 82 the optical element 11 is successively etched with the series of masks, for the example above, with the masks 56a–56c. As is known in VLSI manufacturing, the surface of the optical element 11 is first coated with a layer of photoresist and the first mask 56a is placed on the photoresist. The optical element 11 is then illuminated by ultraviolet light, after which the photoresist is developed. The pattern of the mask 56a is thus placed onto the surface of the optical element 11.

The optical element 11 is etched using any appropriate lithographic process. Suitable processes include chemical or plasma or reactive plasma etching whereby each process has its own minimum manufacturing resolution.

Once the etching has finished, the remaining photoresist is removed, typically via chemical processes. The second mask 56c is then aligned on optical element 11 with a mask aligner. The above operations are repeated until the optical element 11 is etched with the patterns of the entirety of masks 56.

It will be appreciated by persons skilled in the art that the present invention is not limited to what has been particularly shown and described hereinabove. Rather the scope of the present invention is defined only by the claims which follow:

We claim:

1. A binary mask for use in creating a diffractive optical element through a binary masking process, with the completed diffractive optical element having a pattern including at least two phase zones each having a plurality of corresponding descending steps, said mask comprising:

regions of masked and unmasked regions configured such that during a forming step utilizing that mask, the height of at least a portion of one existing step in one phase zone is changed while the height of the entire corresponding step in another phase zone is unchanged whereby in the completed diffractive optical element, the number of steps in said one phase zone will be different than the number of steps in said another phase zone.

2. In a method of fabricating a diffractive optical element including the steps of generating a set of binary masks and using the masks consecutively in a lithographic process to produce a completed pattern including at least two phase zones each having a plurality of corresponding descending steps wherein the improvement comprises at least one forming step wherein the height of at least a portion of one existing step in one phase zone is changed while the height of the entire corresponding step in another phase zone is unchanged whereby in the completed pattern, the number of steps in said one phase zone will be different than the number of steps in said another phase zone.

3. A method of fabricating a diffractive optical element on a substrate, with the completed diffractive optical element having a pattern including at least two phase zones each having a plurality of corresponding descending steps, comprising the steps of:
   a) coating the substrate with a layer of photoresist;
   b) placing a first mask on said layer of photoresist;
   c) exposing said photoresist through said mask thereby producing the mask pattern on the photoresist;
   d) etching said substrate in accordance with the mask pattern; and
   e) repeating steps a through d each time using a different mask to create said pattern and wherein at least one mask is configured such that during the associated etching step, the etching is performed on at least a portion of one existing step in one phase zone to create two steps while the height of the corresponding step in another phase zone is unchanged whereby in the completed diffractive optical element, the number of steps in said one phase zone will be greater than the number of steps in said another phase zone.

* * * * *